July 23, 1940.　　　　　P. M. HALL　　　　　2,208,977
ELECTRODE FOR SPOT WELDING
Filed April 26, 1939
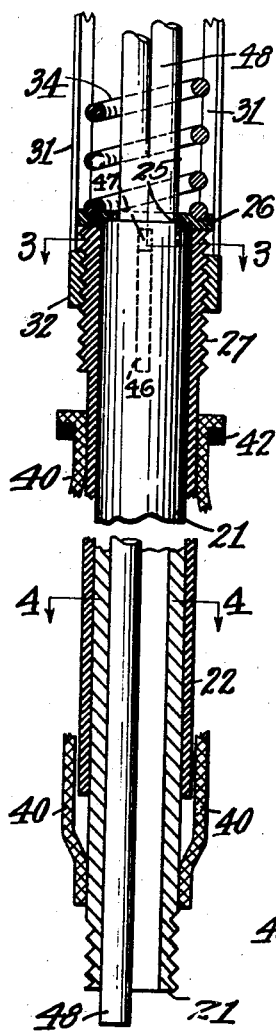
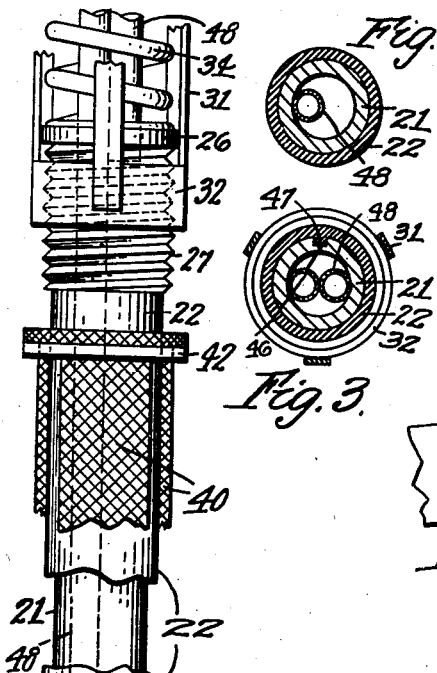
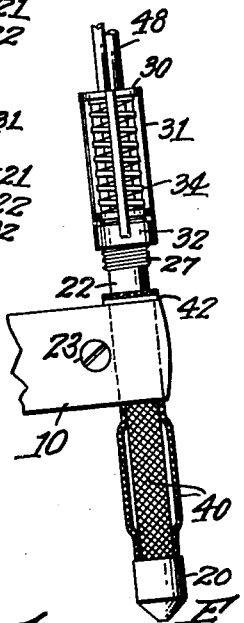
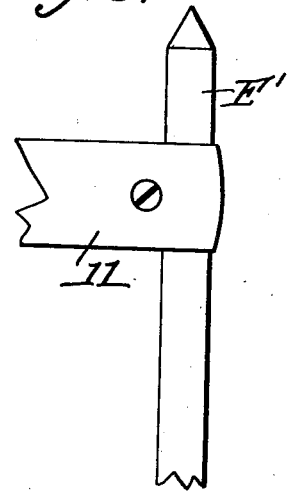
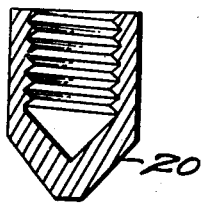
Inventor
Preston M. Hall
By attorney
Chas. T. Hawley Patented July 23, 1940

2,208,977

UNITED STATES PATENT OFFICE 2,208,977

ELECTRODE FOR SPOT WELDING

Preston M. Hall, Worcester, Mass.

Application April 26, 1939, Serial No. 270,196

4 Claims. (Cl. 219—4)

This invention relates to electrodes designed for use in spot-welding machines. While capable of general application, this invention has its particular utility in the welding of non-ferrous metals.

Such metals differ substantially from iron and steel in having very limited periods of plasticity, if any, and in being weldable only at the time of transition from a very brief softened or plastic state to a substantially liquid state. For successful welding of such metals, it is essential that welding pressure in a carefully predetermined amount be instantly applied when the metal reaches a weldable condition, as otherwise burns or unsatisfactory welding will necessarily result.

It is the general object of my invention to produce an improved electrode for spot-welding purposes, so designed as to provide yielding electrode pressure in a readily adjustable and predetermined amount during the preheating and welding operation, which pressure will react on the parts to be welded as soon as welding conditions are reached.

My invention further relates to arrangements and combinations of parts which will be hereinafter described and more particularly pointed out in the appended claims.

A preferred form of the invention is shown in the drawing, in which

Fig. 1 is a side elevation of my improved yielding electrode;

Fig. 2 is a sectional side elevation of the parts shown in Fig. 1;

Figs. 3 and 4 are detail cross sections, taken along the lines 3—3 and 4—4 in Fig. 2 respectively;

Fig. 5 is a sectional elevation of the welding point; and

Fig. 6 is a side elevation of parts of a welding machine having my improved electrode mounted therein.

Referring to Fig. 6, my invention relates particularly to that class of spot-welding machines in which a movable electrode E is mounted in an upper end movable arm 10, and in which a fixed electrode E' is mounted in a lower and fixed arm 11. The parts to be spot-welded are presented between the electrodes E and E', and the electrode E is then moved downward, usually by foot pressure, to engage the work and make welding contact therewith.

My invention resides in the novel construction and operation of the movable electrode E, which construction is shown in detail in Figs. 1 to 5 of the drawing.

A tip or welding point 20 is threaded on the lower end of an inner tube 21 which is slidably mounted in an outer tube 22. The latter tube is secured in the movable arm 10 by a clamping screw 23 (Fig. 6) or in any other convenient manner.

The upper end of the inner tube 21 is seated in a recess 25 (Fig. 2) in the lower face of a washer 26, which washer also abuts the upper end 27 of the outer tube 22. An upper washer 30 is connected by tie bars or links 31 to a nut 32 mounted on the threaded end 27. A spring 34 is held under compression between the washers 26 and 30, as shown in Fig. 6. The pressure of the spring 34 may be adjusted by screwing the nut 32 along the threaded end 27 of the outer tube 22.

Flexible connections are provided between the movable arm 10 and the inner tube 21. These connections are shown herein as comprising a plurality of pieces 40 of copper braid, soldered or otherwise secured at their lower ends to the lower end of the inner tube 21 and preferably assembled and secured at their upper ends in a ring 42. The ring and assembled braids are slidable on the outside of the tube 22, which is inserted between the braids 40 and the tube 21 as the parts are assembled. The upper ends of the braided conductors are thereafter held in fixed relation to the tube 22, as both the braids and the tubes are rigidly clamped in the end of the movable arm 10. The braided conductors are sufficiently flexible to permit limited endwise movement of the inner tube 21 relative to the outer tube 22 during a welding operation, as will be hereinafter described.

The inner tube 21 is splined in its upper end portion, as indicated at 46 (Figs. 2 and 3), and a stud 47 extending inward from the outer sleeve 22 is seated in the spline 46 and prevents relative angular movement between the tubes, while permitting free relative axial or sliding movement. The usual water connections 48 for cooling the welding cap or point 20 are provided as shown.

When an electrode E of the described construction is moved into engagement with metal parts to be welded, further downward movement of the arm 10 causes the outer tube 22 to slide on the inner tube 21 and at the same time causes the spring 34 to apply yielding pressure to the upper end of the inner tube 21 through the washer 26, with which the spring and tube are both engaged. The pressure of the electrode E on the work cannot exceed the yielding pressure provided by the spring 34, which pressure is continuous and may be predetermined by adjustment of the nut 32 on the threaded portion 27 of the sleeve 22.

In normal operation, the downward movement of the arm 10 after engagement of the electrode E with the work is very limited, so that any variation in the spring pressure applied to the work is correspondingly limited.

One very important advantage of my improved electrode is that the yielding pressure is constantly and evenly applied, so that the electrode will maintain contact and predetermined welding pressure on the work throughout the welding operation, and will respond instantly to changes in the physical condition of the metals to be welded. As previously explained, this is extremely important in the welding of non-ferrous metals, where changes in physical condition are extremely rapid.

Having thus described my invention and the advantages thereof, I do not wish to be limited to the details herein disclosed, otherwise than as set forth in the claims, but what I claim is:

1. A yieldable electrode for a spot-welding machine comprising an outer member clamped in said machine, an inner member axially slidable in said outer member, a welding contact mounted on the lower end of said inner member, electric connections to said inner member, and a yieldable spring connection between said inner and outer members, whereby said inner member may yield outwardly relative to said outer member when pressed against the work.

2. A yieldable electrode for a spot-welding machine comprising an outer member clamped in said machine, an inner member axially slidable in said outer member, a welding contact mounted on the lower end of said inner member, electric connections to said inner member, a compression spring, a cage for said spring screw-threaded on said outer member for adjustment of spring pressure, and a slidable transmitting element interposed between the adjacent ends of said spring and said inner member.

3. A yieldable electrode for a spot-welding machine comprising an outer member clamped in said machine, an inner member axially slidable in said outer member, a welding contact mounted on the lower end of said inner member, braided flexible electric connections to said inner member, a single clamping device in said machine for said connections and said outer member, a compression spring, a cage for said spring screw-threaded on said outer member for adjustment of spring pressure, and a slidable transmitting washer interposed between the adjacent ends of said spring and said inner member.

4. A yieldable electrode for a spot-welding machine comprising an outer member clamped in said machine, an inner member axially slidable in said outer member, a welding contact mounted on the lower end of said inner member, flexible electric connections to said inner member, a nut threaded on said outer member, an upper washer, tie-rods supporting said washer in spaced position above said nut, a coiled compression spring enclosed by said tie-rods and washer, and a slidable transmitting member positioned between said tie-rods and interposed between the adjacent ends of said spring and said inner member.

PRESTON M. HALL.